United States Patent [19]

Chen et al.

[11] Patent Number: 4,895,218
[45] Date of Patent: Jan. 23, 1990

[54] MULTISHOT DOWNHOLE EXPLOSIVE DEVICE AS A SEISMIC SOURCE

[75] Inventors: Sen-Tsuen Chen, Sugar Land; Erik A. Eriksen, Houston; Mark A. Miller, Houston; Thomas J. Murray, Jr., Houston, all of Tex.

[73] Assignee: Exxon Production Research Company, Houston, Tex.

[21] Appl. No.: 261,957

[22] Filed: Oct. 24, 1988

[51] Int. Cl.$^4$ .............................................. G01V 1/06
[52] U.S. Cl. ...................................... 181/116; 89/1.15; 102/317; 175/1; 175/4.55
[58] Field of Search ................. 89/1.15; 181/116, 113, 181/106; 175/4.55, 1; 102/217, 215, 317

[56] References Cited

U.S. PATENT DOCUMENTS

| 21,536 | 2/1940 | Pitzer | 166/21 |
|---|---|---|---|
| 2,362,829 | 11/1944 | Kinley | 102/21.8 |
| 2,889,774 | 6/1959 | Allen | 102/20 |
| 2,974,589 | 3/1961 | Bryan | 102/20 |
| 2,988,993 | 6/1961 | Throner | 89/1.15 |
| 3,171,063 | 2/1965 | Hutchinson et al. | 317/80 |
| 3,690,164 | 9/1972 | Gabillard et al. | 73/151 |
| 4,051,907 | 10/1977 | Estes | 175/4.55 |
| 4,313,380 | 2/1982 | Martner et al. | 181/116 |
| 4,445,435 | 5/1984 | Oswald | 102/215 |
| 4,496,008 | 1/1985 | Pottier | 175/4.56 |
| 4,496,010 | 1/1985 | Chapman | 175/4.55 |
| 4,497,044 | 1/1985 | Silverman | 181/116 |
| 4,502,550 | 3/1985 | Ibsen | 175/4.6 |
| 4,527,636 | 7/1985 | Bordon | 175/4.55 |
| 4,671,379 | 6/1987 | Kennedy et al. | 181/106 |
| 4,674,047 | 6/1987 | Tyler et al. | 102/217 |
| 4,702,343 | 10/1987 | Paulsson | 181/106 |
| 4,715,470 | 12/1987 | Paulsson | 181/106 |

*Primary Examiner*—Charles T. Jordan
*Assistant Examiner*—J. Woodrow Eldred
*Attorney, Agent, or Firm*—C. Milton Fick

[57] ABSTRACT

A downhole seismic acoustical signal source capable of selectively firing numerous, prewired explosive charges. The downhole seismic source uses a self-contained firing circuit that is capable of receiving select and fire signals from a seismic crew at the ground surface through a standard seven conductor wireline cable to detonate the explosive charges. The downhole seismic source is capable of generating numerous signals in a given downhole trip through the firing of many individual explosive charges.

7 Claims, 1 Drawing Sheet

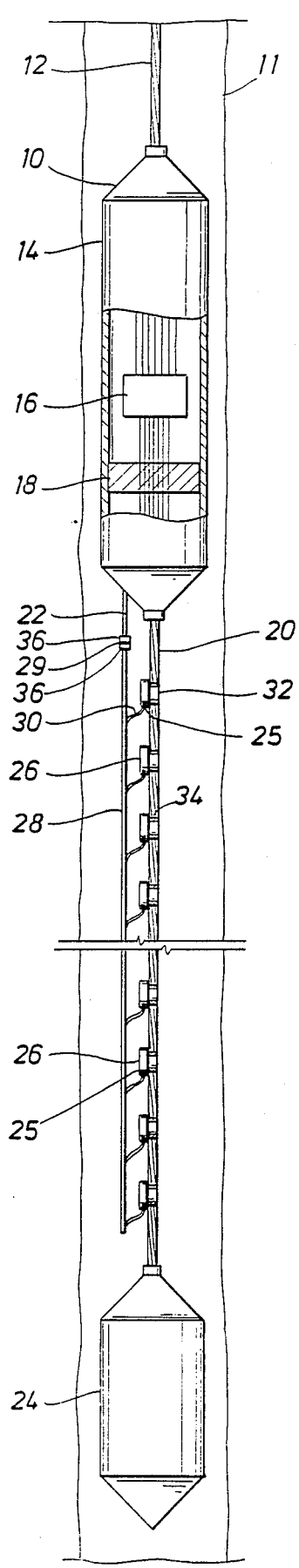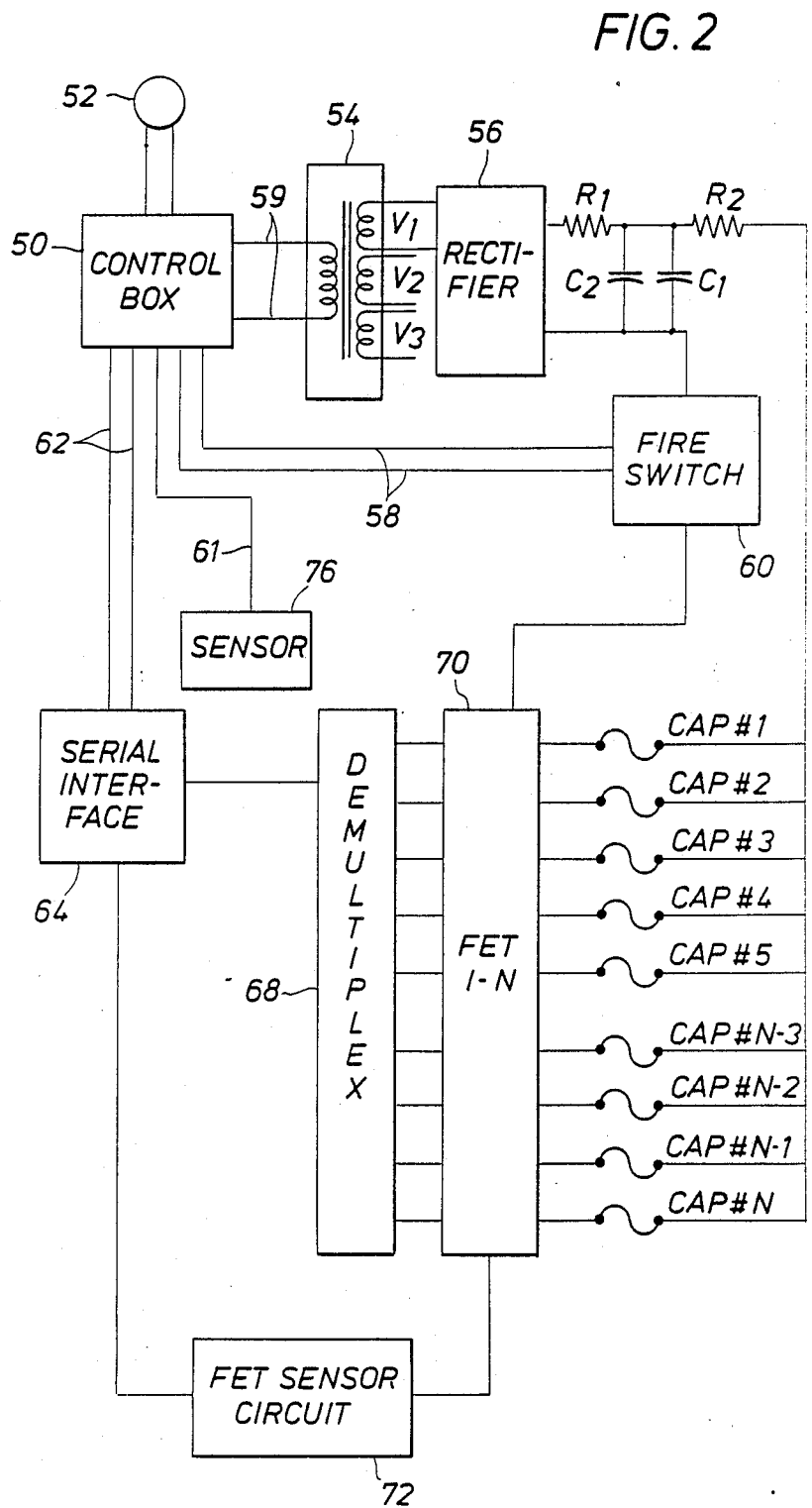

MULTISHOT DOWNHOLE EXPLOSIVE DEVICE AS A SEISMIC SOURCE

FIELD OF INVENTION

The present invention relates generally to creation of seismic waves for use in geophysical prospecting of subsurface formations. More specifically, this invention concerns a downhole seismic source capable of producing seismic waves through multiple explosions for use in reversed Vertical Seismic Profiling and cross-hole seismology.

BACKGROUND OF THE INVENTION

In geophysical prospecting, seismic operations are frequently used to generate, collect, and analyze information about subsurface formations. Such seismic operations are typically performed by initiating seismic disturbances at a point near or at the surface of the earth so that seismic waves are generated downward into the earth at that point. These seismic waves, or acoustical signals, travel downward into the earth until they encounter discontinuities in the earth's structure in the form of varying subsurface strata formations. Such discontinuities reflect at least part of the acoustical signals back toward the earth surface. In oil and gas exploration operations, these reflected acoustical signals are recorded and studied to help locate and analyze various subsurface formations for potential oil and gas production.

In oil and gas operations, seismic energy sources, such as dynamite or blasting cord, are frequently used to generate the acoustical signals. Also, large truck-mounted seismic sources such as vibrators or thumpers are used to generate the acoustical signals.

After the acoustical signals have been generated and then reflected by the subsurface formations, the reflected signals are measured and recorded at various locations on the ground surface by sensitive geophones or other seismic receivers for interpretation. These recorded signals are then studied to determine the likelihood that a given subsurface strata contains producible hydrocarbons.

One variation of the typical seismic exploration method mentioned above is called Vertical Seismic Profiling ("VSP"). VSP is known to be valuable in structural and stratigraphic interpretation of subsurface formations and geological prospecting for oil and gas. In VSP, a geophone or other type of acoustic detector is lowered into a wellbore. Acoustical signals are then generated at various ground surface locations offset from the wellbore. Recordings are made through the geophone at various levels in the wellbore. This differs from usual seismic operations which have both the seismic source for generating the acoustical signals and the receivers at or near the ground surface.

In VSP, the acoustical signals travel from the signal source through the near ground surface only once on their way to the geophone in the wellbore. This results in less attenuation of high frequency waves than occurs for typical surface seismic operations where the signals must travel through the near ground surface twice. These higher frequencies give VSP better resolution than surface seismic methods.

A disadvantage of VSP is that numerous offset energy source locations, some at large distances from the wellbore, are required to obtain the amount of seismic information necessary to properly study a given subsurface formation. Placement of these offset energy sources is time consuming and expensive. Often the placement of the seismic energy sources, such as dynamite, blasting cord, or large vibrators or thumpers, at a desired location is difficult. Seismic sources must be kept some distances from buildings, dwellings, roads, and other structures that would be affected by blasting or the use of dynamite. Also roads to isolated exploration areas may not allow for transporting large pieces of seismic source equipment to required locations.

In order to obtain the benefits of VSP in areas where using a seismic source to create acoustical signals from a surface location may be difficult, a modified VSP method, referred to as reversed VSP, is used. In reversed VSP, a seismic source is placed in the wellbore and geophones or other type of acoustical detectors are laid out on the surrounding ground surface. The surface receivers can be located in positions that would not permit the use of dynamite or are inaccessible to seismic sources such as large vibrators. In addition to being useful in places conventional VSP cannot be used, reversed VSP is capable of obtaining higher quality data than conventional VSP. In reversed VSP operations, receivers can be buried in complicated arrays which improve the frequency content of the reflected signals and reduce noise in the reflected signals. Accordingly, higher frequency and more consistent data can be recorded with reversed VSP than with conventional VSP. The most significant advantage of reversed VSP is that a single downhole seismic source, if used with a large number of geophones at the ground surface, can generate data equivalent to many standard VSP operations with various offsets.

A seismic operation similar to reversed VSP is cross-hole seismology. In cross-hole seismology, a seismic source is lowered into one wellbore and a geophone is lowered into a second wellbore. The seismic source creates acoustical signals that travel from the first wellbore to the second wellbore where the signals are measured and recorded. Cross-hole seismology does not require the laying out of surface geophones as is required in reversed VSP. Because the acoustical signals do not have to travel through the near ground surface, seismic data is produced having high resolution and a high signal-to-noise ratio. Cross-hole seismology is most generally used in a producing field, where existing wellbores may be used to provide additional information about previously discovered reservoirs.

There are various downhole energy sources available for use in reversed VSP and cross-hole seismology. Early methods for generating acoustical signals included the use of large wrappings of explosive blasting cord, sidewall coring guns, and perforating guns. Although these methods could provide an energy source of acceptable intensity for the generation of acoustical signals, blasting cord allowed only a single explosion for each downhole trip and sidewall coring and perforating guns were very damaging to the casing or wellbore. Currently, individual explosive charges or series of explosive charges without the damaging effects of the above mentioned guns are frequently used. These charges are electrically detonated from the ground surface by a seismic crew through a standard seven conductor wireline cable. The use of a standard wireline cable, however, limits the number of individual explosions available to be fired on a single downhole trip with a downhole seismic source.

Another downhole seismic source currently used is an air gun. An air gun arrangement uses a firing control line and a high pressure air hose to produce downhole acoustical signals. An advantage an air gun has is that it may be moved up and down the wellbore and repeatedly fired at various positions on a single downhole trip. However, an air gun has mechanical limitations and use restrictions that can make its operation and handling difficult. The firing control line and high pressure air hose are very bulky and can be difficult to operate in a deep wellbore. Also, a downhole air gun usually produces less acoustical energy than a 10 gram explosive charge of a standard pentaerythritol tetranitrate (PETN) explosive. Because of this relatively weak energy source level, air guns are usually used only for cross-hole seismology and not for reversed VSP.

Another disadvantage of using an air gun is that air guns produce more tube-wave energy in the wellbore than do downhole explosives. Existence of such tube waves (referred to as "noise") complicates data processing and interpretation of the recorded data. Additionally, air bubbles are produced during operation of an air gun which change the acoustical properties of the mud column, which in turn affects the tube wave velocity and further complicates signal processing. Finally, an air gun's performance may be adversely affected by large hydrostatic pressures such as when the gun is operated at significant depths.

The downhole energy source that generates the most desirable acoustical signals is an explosive charge, such is obtained in firing a sidewall coring gun or perforating gun. Explosive shot arrangements, without the damaging effects of coring guns or perforating guns, are commercially available. The firing of these explosive shot arrangements can be controlled at the ground surface through a standard seven conductor wireline cable. A limitation in using standard surface firing control equipment with a standard seven conductor wireline cable is that only up to six individual or group shots can be fired before a downhole firing arrangement must be removed from the wellbore and reloaded. Since in typical reversed VSP and cross-hole seismology operations, the firing of hundreds or even thousands of shots might be required to generate the necessary amount of seismic information, a downhole firing apparatus using a standard surface firing control arrangement would require many downhole trips. Such numerous trips are time consuming, expensive, and prevent quick gathering of large amounts of data.

A downhole seismic source is required that is capable of firing a large number of independent explosive shots on a single downhole trip using a standard seven conductor wireline cable. The present invention provides this capability through the use of a downhole firing circuit to select and fire numerous explosive shots in a single downhole trip.

SUMMARY OF THE INVENTION

Briefly, the present invention is directed to a downhole seismic source capable of selectively firing numerous explosives in a downhole arrangement to produce seismic waves in a subsurface formation. The downhole seismic source utilizes a protective housing, a plurality of explosive charges, means for supporting the explosive charges, and means for selectively firing the plurality of explosive charges from a surface location. During operation a control signal from a surface seismic crew is sent downhole to activate at least one of a series of switches in a firing control arrangement to select a specific explosive charge to detonate. A firing signal is then given which closes a downhole electrical circuit to discharge a capacitor arrangement, which fires the explosive charge corresponding to the selected activated switch. Another switch and corresponding explosive charge may be selected and the firing cycle repeated until each of the multiple explosive charges have been fired.

A preferred embodiment of the downhole seismic source would include firing circuitry consisting of a downhole transformer and rectifier for charging a capacitor arrangement used in storing energy necessary to detonate the downhole explosives. A serial interface and demultiplex arrangement would also be used in selecting the explosive charge to be detonated. This firing circuitry and corresponding explosive charges describes a downhole seismic source having the capability of firing numerous explosive charges on a single downhole trip.

BRIEF DESCRIPTION OF THE DRAWINGS

For a better understanding of the present invention, reference may be had to the drawings, in which:

FIG. 1 shows a side view, partly in section, of one embodiment of the apparatus of this invention; and FIG. 2 shows an electrical schematic of one embodiment of the firing circuitry of this invention.

These drawings are not intended in any way to define the present invention, but are provided solely for the purpose of illustrating certain preferred embodiments and applications of the present invention.

DESCRIPTION OF THE PREFERRED EMBODIMENTS

FIG. 1 shows a preferred embodiment of the present invention, a multishot downhole seismic source, which includes a plurality of self-contained electronic firing switches for selectively firing numerous, prewired downhole explosive charges. During operation of the seismic source by a seismic crew, the downhole seismic source is lower in the wellbore to the desired depth. Electrical energy is transmitted downhole through a standard seven conductor wireline cable and stored in a capacitor arrangement. The stored energy is then discharged through switches selected by the seismic crew when a fire command is given. The discharged energy ignites selected firing caps, which in turn detonate selected explosive charges. The seismic source may then be moved to a different depth and the cycle repeated. By increasing the number of electronic firing switches and downhole switching controls and the number of explosive charges in the seismic source, a large number of charges may be independently fired in a single downhole trip using the present invention.

FIG. 1 shows downhole seismic source 10 in wellbore 11 suspended from standard seven conductor cable wireline 12. Wireline 12 is attached to protective housing 14 which contains electronic firing controls 16. Protective housing 14 may be made of any material capable of withstanding pressure shocks caused by firing explosive shots 26 inside the wellbore. In test units, protective housing 14 has been fabricated using stainless steel because of its high strength. Such material is well known in the oil industry. Also enclosed in protective housing 14 is shock dissipator 18. Shock dissipator 18 protects firing controls 16 from shock waves generated by the firing of explosive shots 26. Firing controls 16 are shown in FIG. 2 and are more fully described below.

Extending out from the lower part of protective housing 14 is support cable 20 and wiring patch cable 22. Support cable 20 extends from below protective housing 14 to sinker weight 24. Sinker weight 24 may be any standard weight device that allows support cable 20 to be fully extended below protective housing 14. It is possible that the described downhole seismic source 10 could be modified so that sinker weight 24 would not be necessary. An alternative might include placing protective housing 14 at the bottom of wireline 12 with explosive shots 26 connected to wireline 12 above protective housing 14. If the protective housing is placed below the explosive shots, it would be necessary to further protect the wireline or other support arrangement from the potentially damaging effects of the explosive shot firings.

Wiring patch cable 22 is a wire arrangement which provides an electrical circuit path from firing controls 16 to blasting caps 25 which are used for detonating individual explosive shots 26. The use of blasting caps for detonating explosive charges is widely known and used in the oil industry and does not require additional discussion. The control wiring from firing controls 16 passes through wiring patch cable 22 and wiring harness 28 to blasting caps 25. Extending from wiring harness 28 is individual shot wiring 30.

Each explosive shot 26 is connected to support cable 20 through tie wraps 32. In order to protect support cable 20 from damage caused by the firing of explosive shots 26, dual braided air hose 34 or other protective material is placed between explosive shots 26 and support cable 20.

Like wiring patch cable 22, wiring harness 28 is a wire arrangement that provides an electrical circuit path between firing controls 16 and the individual blasting caps 25 in each explosive shot 26. Wiring harness 28 is connected to patch cable 22 through connectors 36. Wiring harness 28 may be allowed to hang freely along side cable 20 or maybe secured to cable 20 by wrapping harness 28 around cable 20. Also, wiring harness 28 may be taped or tie wrapped to support cable 20. When loading explosive shots 26 to support cable 20 and wiring harness 28, shorting plug 29 should be inserted between connectors 36 as shown in FIG. 1. Alternately, wiring harness 28 may be separated from wiring patch cables 22 at connectors 36 and shorting plug 29 may be inserted into the end of wiring harness 28 at connector 36. Shorting plug 29 will help prevent discharge of explosive shots 26 should an electrical current be accidentally introduced to wiring harness 28.

The distance between individual explosive shots 26, which are attached to cable 20, depends on numerous factors, including the amount of the charge to be used and the wellbore size and condition. Test results have shown that the required separation between explosive shots 26 for a 26 gram charge of PETN explosive in a six inch open wellbore hole is about one foot. This separation distance prevents undesirable detonation of adjacent explosive shots.

The device shown in FIG. 1 is capable of firing numerous shots in each downhole trip. The maximum number of shots is limited only by the length of support cable 20 and wiring harness 28 that is acceptable for running in the hole.

FIRING CONTROLS

FIG. 2 shows an electrical schematic of one embodiment of the firing circuitry of this invention. Control box 50, which is located on the ground surface, is used by the seismic crew for directing the operation and firing of the downhole seismic source. Cables 59, cables 62, cables 58, and cable 61 extend from control box 50. Cables 59 are used to supply firing power to the explosive shots; cables 62 are used to select the individual explosive shots to be fired; cables 58 are used to transmit firing signals to the downhole firing controls; and cable 61 is used to inform the seismic crew that the shots have fired. Cables 59, cables 62, cables 58, and cable 61 together comprise a standard seven conductor wireline cable. FIG. 1 shows these cables collectively as wireline 12.

The power used for shot firing and firing controls comes from current source 52. The power used in tests of the preferred embodiment has been 100 volts AC and 200 milliampere for the downhole firing configuration as shown. The current source is connected through conductor cables 59 to multioutput transformer 54. In the preferred embodiment, transformer 54 has multiple voltage outputs, V1, V2, and V3. V1 (350 volts in the preferred embodiment) is used in firing the explosive charges and two smaller voltages, V2 and V3 (15 volts and 5 volts, respectively, in the preferred embodiment), are used in control and sensor mechanisms. Firing output current from transformer 54 is connected to rectifier 56. Rectifier 56 is arranged to charge capacitors $C_1$ and $C_2$ for energy storage required to detonate a selected blasting cap and the corresponding explosive shot. It has been found that 60 microfarad capacitors are adequate for firing an individual blasting cap. Normally, an electrical pulse of 350 volts at 50 amps for a duration of approximately 200 microseconds is sufficient to fire each blasting cap.

Leaving rectifier 56 are current limiting resistors, $R_1$ and $R_2$, which are connected in series to each blasting cap that is inserted in the individual explosive shots on the support cable. FIG. 2 shows these blasting caps as cap 1 through cap N. FIG. 1 shows these as blasting caps 25.

From control box 50 are also cables 58 which travels to fire switch 60. Fire switch 60 is a silicone controlled rectifier type switch, commonly referred to as a SCR. After a fire command is given to fire switch 60, capacitors $C_1$ and $C_2$ are discharged to detonate a preselected cap which in turn fires the corresponding explosive shot. Fire switch 60 of the preferred embodiment will automatically open after capacitors $C_1$ and $C_2$ are discharged and the current drops to below a holding current of approximately 20 milliamperes. Such firing switches are known and commercially available in the industry.

Also connected to control box 50 through cables 62 is serial interface 64. Serial interface 64 receives a signal from control 50 indicating the desired cap and corresponding explosive shot to be fired. Serial interface 64 then produces a binary coded command which is sent to demultiplex arrangement 68. Demultiplex arrangement 68 is an electrical circuit system capable of receiving the binary-coded command from serial interface 64 and activating a selected output. In the present embodiment, demultiplex arrangement 68 is for controlling FET (field effect transistor) switches 1 through N. The FET switches used in the preferred embodiment have normally opened contacts that can be closed by applying a small voltage to the switch. Connected to the FET arrangement 70 is FET sensor circuit 72 which is in turn connected to serial interface 64. FET circuit sensor 72 is used to monitor the status of the FET switches and confirm that the proper switch has been selected. Such serial interfaces, demultiplex arrangements, FET switches, and circuit sensors are well known and readily available in the industry.

Finally connected to control box 50 through cable 61 is sensor 76. Sensor 76, a low sensitivity geophone or other detection device, is placed in the downhole seismic source to verify the charge detonations. In the preferred embodiment, firing circuitry of FIG. 2 consisting of transformer 54, rectifier 56, resistors $R_1$ and $R_2$, capacitors $C_1$ and $C_2$, fire switch 60, serial interface 64, FET sensor circuit 72, demultiplex arrangement 68, FET arrangement 70, and sensor 76 would be contained in protective housing 14 as shown in FIG. 1.

OPERATION

Before beginning reversed VSP or cross-hole seismology operations, downhole seismic source 10 is lowered slightly into wellbore 11. Shorting plug 29 is then removed from connectors 36 and wiring patch cable 22 is attached to wiring harness 28 by connectors 36. Sinker weight 24 and explosive shots 26 should be lowered some distance into wellbore 11 before shorting plug 29 is removed and wiring patch cable 22 is attached to wiring harness 28. This safety precaution will assist in preventing an accidental detonation of blasting caps 25 and explosive shots 26 which might be caused by an unexpected stray current in the circuiting such as from static electricity, a ground in the electrical system, or even from lightning. If a stray current is present when patch cable 22 is connected to harness 28 which causes an accidental firing of explosive shots 26, there will be less chance of personal injury if the firing occurs some distance downhole. After shorting plug 29 is removed and this connection is made, the wiring between firing controls 16 and blasting caps 25 and explosive shots 26 is completed and downhole seismic source 10 may be lowered into wellbore 11.

After the downhole seismic source is lowered to the desired level for generation of acoustical signals, one or more explosive shots 26 are selected for firing. Passing through cables 59, transformer 54, and rectifier 56, electrical current charges capacitors $C_1$ and $C_2$. A serial command is given from surface control box 50 through cables 62. This command is demultiplexed to close the selected FET switch or switches to complete the circuit through the selected cap or caps. The selected caps and explosive shots are then ready to be fired by closing firing switch 60. In selecting the firing order of the explosive shots 26, it is preferable that firing starts with the shots farthest from protective housing 14. Such a firing order will protect the individual shot wirings closer to protective housing 14 in wiring harness 28 from possible damage caused by the firing of explosive shots 26 until that pair of wires to an individual shot 26 has been used. In FIG. 1, this would mean first firing shots 26 closest to sinker weight 24, and then firing shots 26 that are next closest to sinker weight 24 until all explosive shots 26 have been fired.

The firing command issued from the surface control box 50, closes fire switch 60. By closing fire switch 60, capacitors $C_1$ and $C_2$ are discharged to fire the selected cap which detonates the corresponding explosive shot 26. After the explosive shot is fired, fire switch 60 opens and capacitors $C_1$ and $C_2$ are recharged and readied for the next firing. Downhole seismic source 10 may then be moved to another position. A new serial command is then given, which selects and closes another FET switch. The firing command is again issued to discharge capacitors $C_1$ and $C_2$ and detonate the newly selected cap to fire the corresponding shot 26. This cycle can be immediately repeated to generate numerous downhole seismic signals.

As apparent from the description of this apparatus, the number of shots and the size of each shot may vary widely. Shot sizes can be as large or as small as necessary. Likewise the number of shots may vary. Field tests have shown that a 32 shot arrangement is very workable and easily fabricated. This arrangement allows 32 individual shots of equal or varying size, to be fired in a single downhole trip.

Following the firing of all explosive shots 26 on support cable 20, downhole seismic source 10 can be removed from the wellbore and rapidly refit with a previously prewired explosive arrangement, complete with wiring harness 28, support cable 20, sinker weight 24, firing caps 25, and explosive shots 26. After remounting a new support cable 20 with explosive shots 26 and connecting a replacement wiring harness 28 to patch cable 22 through connectors 36, downhole seismic source 10 is ready for another downhole trip and firing sequence. Depending on the shot size, support cable 20 can be reused, but an inspection should be made to ensure that the individual explosive shots have not damaged the support cable before the cable is reused.

Because wiring harness 28 is quickly and inexpensively fabricated, it may be considered a disposable item. It is envisioned that the support cable 20, tie wraps 32, wiring harness 28 and individual shot wirings 30 could be prewired and preconnected before work begins at the wellbore site. Also, sections of wiring harness 28 may be easily prefabricated with a given number of shot wiring connections for connection in a series arrangement. By connecting such prefabricated wiring harnesses together, a downhole seismic source with the corresponding firing controls could use as many prefabricated sections as required for the number of explosive shots to be fired. This would allow for many seismic shots being fired quickly and efficiently.

The preferred embodiment of the present invention has been described above. It should be understood that the foregoing description is intended only to illustrate certain preferred embodiments of the invention and is not intended to define the invention in any way. Other embodiments of the invention can be employed without departing from the full scope of the invention as set forth in the appended claims.

What is claimed is:

1. An apparatus for generating a downhole seismic source, said apparatus comprising:
   a capacitor;
   a firing switch connected in series with the capacitor and in series with a plurality of parallel field effect transistor switches;
   a plurality of explosive charges connected in a series electrical arrangement to the firing switch and to the plurality of parallel field effect transistor switches;
   a serial interface control for producing a binary coded command in response to a control signal;

means for receiving the binary coded command and activating at least one of the field effect transistor switches, whereby the plurality of explosive charges may be detonated in a sequence controlled from a remote location; and a protective housing in which are mounted the capacitor, the firing switch, the field effect transistor switches, the serial interface control, and the means for receiving the binary coded command and activating at least one of the field effect transistor switches.

2. The apparatus of claim 1 wherein the means for supporting the plurality of explosive charges comprises:

a cable connected at one end to the protective housing, whereby the cable extends below the protective housing and provides a means to support, attach, and space the plurality of explosive charges; and a sinker weight connected at the opposing end of the cable from the protective housing, whereby allowing the sinker weight to hang freely and fully extend the cable below the protective housing.

3. An apparatus for generating a downhole seismic energy source, said apparatus comprising:

a downhole transformer;

a current source providing current to the downhole transformer;

means for rectifying current output of said transformer into direct electrical current;

a plurality of capacitors in a parallel arrangement for storing the direct electrical current;

a firing switch connected in series with the plurality of capacitors;

a plurality of explosive charges connected in a series electrical arrangement to a plurality of parallel field effect transistor switches;

means for directing current discharged from the plurality of capacitors through the firing switch and through the plurality of parallel field effect transistor switches, whereby the plurality of explosive charges may be detonated in a controlled sequence; and a protective housing in which are mounted the downhole transformer, the means for rectifying the current output of the transformer, the plurality of capacitors, the firing switch, the field effect transistor switches and the means for directing current discharged from the plurality of capacitors through the firing switch and through the plurality of field effect transistor switches.

4. The apparatus of claim 3 wherein the means for directing the current discharged from the plurality of capacitors through the firing switch and through the plurality of parallel field effect transistor switches comprises:

a serial interface control for producing a binary coded command in response to a control signal; and means for receiving the binary coded command and activating at least one of the field effect transistor switches that controls the opening and closing of each field effect transistor switch independently with the serial interface being controlled from a remote location.

5. The apparatus of claim 4 and further comprising a shock isolator mounted in the protective housing, whereby protecting the downhole transformer, the means for rectifying the current output of the transformer, the plurality of capacitors, the serial interface control, and the means for receiving the binary coded command and activating at least one of the field effect transistor switches from damage caused by explosive forces generated by detonation of the plurality of explosive charges.

6. The apparatus of claim 5 and further comprising:

a cable connected at one end to the protective housing, whereby the cable extends below the protective housing and provides a means to support, attach, and space the plurality of explosive charges; and a sinker weight connected at the opposing end of the cable from the protective housing, whereby allowing the sinker weight to hang freely and fully extend the cable below the protective housing.

7. The apparatus of claim 6 further comprising a wiring harness providing electrical connection between the FET switches and the plurality of explosive charges wherein the wiring harness is a prefabricated wiring arrangement with wiring connections to each explosive charge, whereby the wiring arrangement is easily replaceable following detonation of the plurality of explosive charges.

* * * * *